United States Patent
Crano et al.

(10) Patent No.: US 7,549,330 B2
(45) Date of Patent: Jun. 23, 2009

(54) LEAK DOWN DEVICE FOR TIRE PRESSURE MONITORING SYSTEM

(75) Inventors: Richard Nicholas Crano, Akron, OH (US); Peter Ross Shepler, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/855,187

(22) Filed: Sep. 14, 2007

(65) Prior Publication Data

US 2009/0071238 A1    Mar. 19, 2009

(51) Int. Cl.
B60C 23/02    (2006.01)
(52) U.S. Cl. ...................................... 73/146.8
(58) Field of Classification Search ................ 73/146.8; 340/445
See application file for complete search history.

(56) References Cited

U.S. PATENT DOCUMENTS 4,813,268 A * 3/1989 Helvey ....................... 73/40.7
5,977,870 A * 11/1999 Rensel et al. ............... 340/447
6,880,598 B2 * 4/2005 Haunhorst et al. .......... 152/415

* cited by examiner

Primary Examiner—Andre J Allen
(74) Attorney, Agent, or Firm—Richard B. O'Planick

(57) ABSTRACT

A tire and wheel rim assembly includes a tire supporting rim having an outward facing mounting surface; a tire mounted to the rim positioning an internal tire cavity over the rim mounting surface; a passageway extending through the rim for communicating air pressure between the tire cavity and a side of the rim opposite the tire cavity; and means for controllably regulating the flow of air through the passageway. A connecting member such as a bolt may extend through the rim outside mounting surface to affix a tire pressure monitoring housing to the rim and the axial passageway through the rim may be an axial bore through the bolt. Regulation of air flow through the passageway may be effected by setting the diameter of the passageway sufficiently small; or incorporating a needle orifice in the passageway; or incorporating a porous insert body into the passageway. The insert body may be composed of sintered metal and may be fused to the internal sidewalls of the bolt.

20 Claims, 5 Drawing Sheets

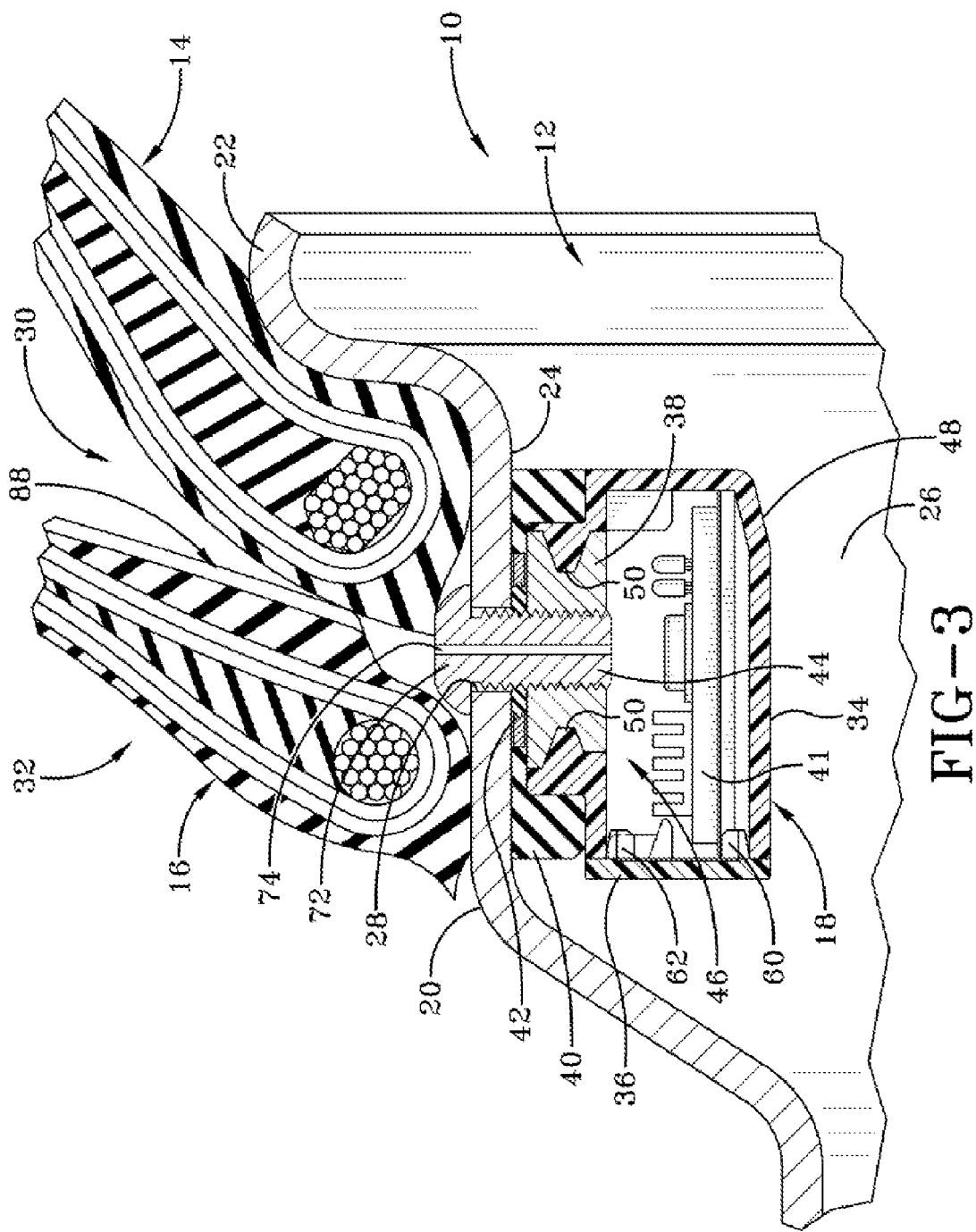

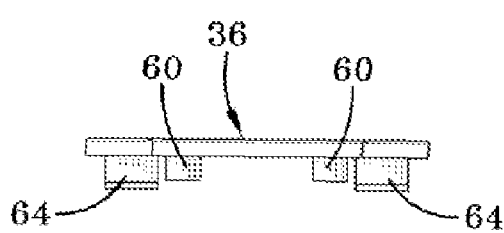
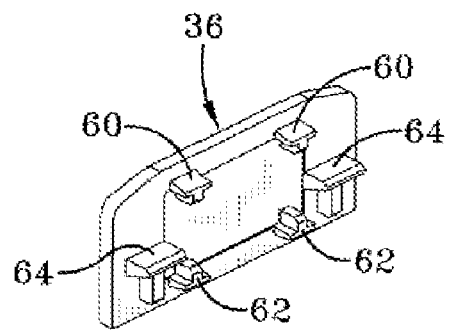
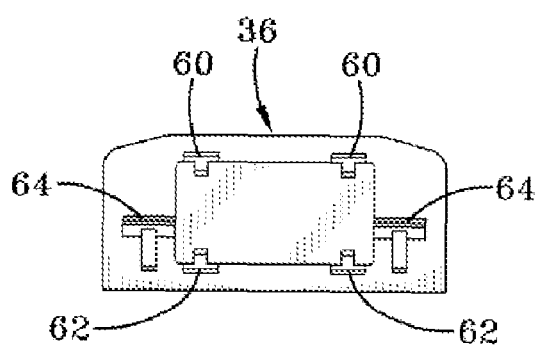
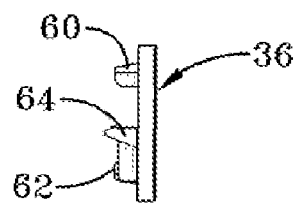
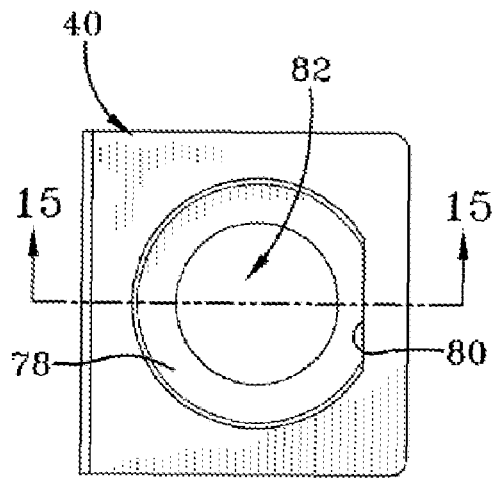
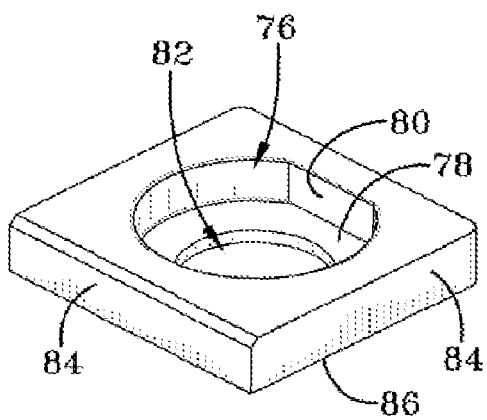
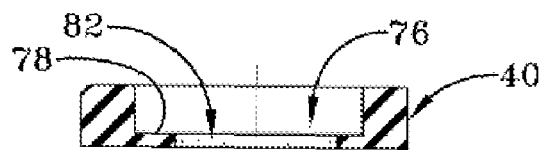

LEAK DOWN DEVICE FOR TIRE PRESSURE MONITORING SYSTEM

FIELD OF THE INVENTION

The invention relates generally to tire pressure monitoring systems and, more specifically, to housing assemblies for such systems.

BACKGROUND OF THE INVENTION

Typical commercially available tire pressure monitoring system units are mounted to the inside of a tire in a position from which the air pressure within the tire cavity may be measured. Data representing pressure within the tire is then communicated by a transmitted signal to a reader external to the tire. For example, certain available units integrate a pressure sensing module with the valve stem of a tire. Electronics within the sensor unit measure the air pressure at the valve stem and transmit an appropriate signal to an external receiver. The receiver may be proximally located to the sensor unit or in a remote location such as the passenger compartment.

While working well, such systems are not useful in meeting the industry's needs in certain applications. For example, in some applications, such as in NASCAR race tires, there is a need for a tire pressure-measuring device that may be used conveniently in a two tire system by officials to check start inflation pressure. A rim-mounted tire pressure monitoring system has been proposed and is the subject of co-pending U.S. patent application Ser. No. 11/641,333 filed Dec. 19, 2006, incorporated herein by reference.

In a rim mounted system, a housing typically molded of plastics material is employed to house sensor and communication electronics. The housing has an internal pressure chamber; a pressure sensing device within the housing pressure chamber, and a portal communicating through the wheel rim between the internal housing pressure chamber and a tire air cavity. The TPMS housing unit is mounted to a rim ledge with a bolt. The bolt has a hole drilled therethrough to allow communication of the inflation pressure within the tire to the pressure chamber within the TPMS housing. The bolt threads into a threaded insert nut that is molded into the plastic TPMS housing. An appropriate seal is used between the insert nut and the rim. In other systems, a pipe is attached to a portal within the rim through which pressure is communicated with the housing pressure chamber. The pipe routes along an outer rim surface to a different rim location where the pipe attaches to a second portal through the rim.

While working well, a rim mounted TPMS housing is exposed to potentially damaging external forces. It is possible for the TPMS housing to become damaged and even disconnected from the rim ledge mounting surface under certain situations. In such an event, the air within the tire will leak rapidly out of the hole in the bolt, potentially resulting in loss of control of the vehicle. In a dual portal system utilizing a pipe extending between two passageways in the rim, damage to the pipe or the TPMS housing can result in the exposure of a passageway and resultant rapid loss of air from a tire. In applications where the vehicle is driven at high speed, such as NASCAR racing, it is even more important to prevent rapid pressure loss in a tire that can negatively impact the driver's control of the vehicle.

Accordingly, a need exists in rim-mounted TPMS systems for a means to avoid rapid deflation of a tire through a rim portal in the event that the portal becomes exposed. Exposure of a portal may occur where an external TPMS housing becomes damaged or detached from the rim or where ancillary hardware such as a connector pipe detaches from a portal in a wheel rim. Ideally, the solution to the industry's needs would be capable of giving the driver a warning early enough to allow the driver to take corrective action before tire inflation crosses over a critical safety threshold.

SUMMARY OF THE INVENTION

Pursuant to one aspect of the invention a tire and wheel rim assembly includes a tire supporting rim having an outward facing mounting surface; at least one tire body mounted to the rim positioning an internal tire cavity over the rim mounting surface; a passageway extending through the rim for communicating air pressure between the tire cavity and a side of the rim opposite the tire cavity; and means for controllably regulating the flow of air through the passageway.

According to another aspect of the invention, a tire pressure monitoring module assembly is provided including a housing having an internal pressure chamber; a pressure sensing device within the housing pressure chamber; an elongate connecting member extending through the housing and the rim mounting surface, the passageway extending axially through the connecting member in communication with the internal tire cavity and the housing pressure chamber.

In a further aspect of the invention, the connecting member is a bolt extending through the rim outside mounting surface and the axial passageway extends through the bolt.

Regulation of air flow through the passageway may be by setting the diameter of the passageway sufficiently small; or incorporating a needle orifice in the passageway; or incorporating a porous insert body into the passageway. The insert body may be composed of sintered metal and may be fused to the internal sidewalls of the bolt.

BRIEF DESCRIPTION OF THE DRAWINGS

The invention will be described by way of example and with reference to the accompanying drawings in which:

FIG. 3 is a transverse section view through a tire rim portion having a pair of tire bodies mounted thereto, and a tire pressure monitoring module mounted to the rim portion pursuant to the invention.

FIG. 10 is a front perspective view of the housing cover.

FIG. 11 is a side elevation view of the housing cover.

FIG. 12 is a front elevation view of the housing cover.

FIG. 13 is an end elevation view of the housing cover.

FIG. 14 is a plan view of the gasket component of the TPMM.

FIG. 15 is a sectional view through the gasket taken along the line 15-15 of FIG. 14.

FIG. 16 is a front perspective view of the gasket.

DETAILED DESCRIPTION OF THE INVENTION

Figure 1:
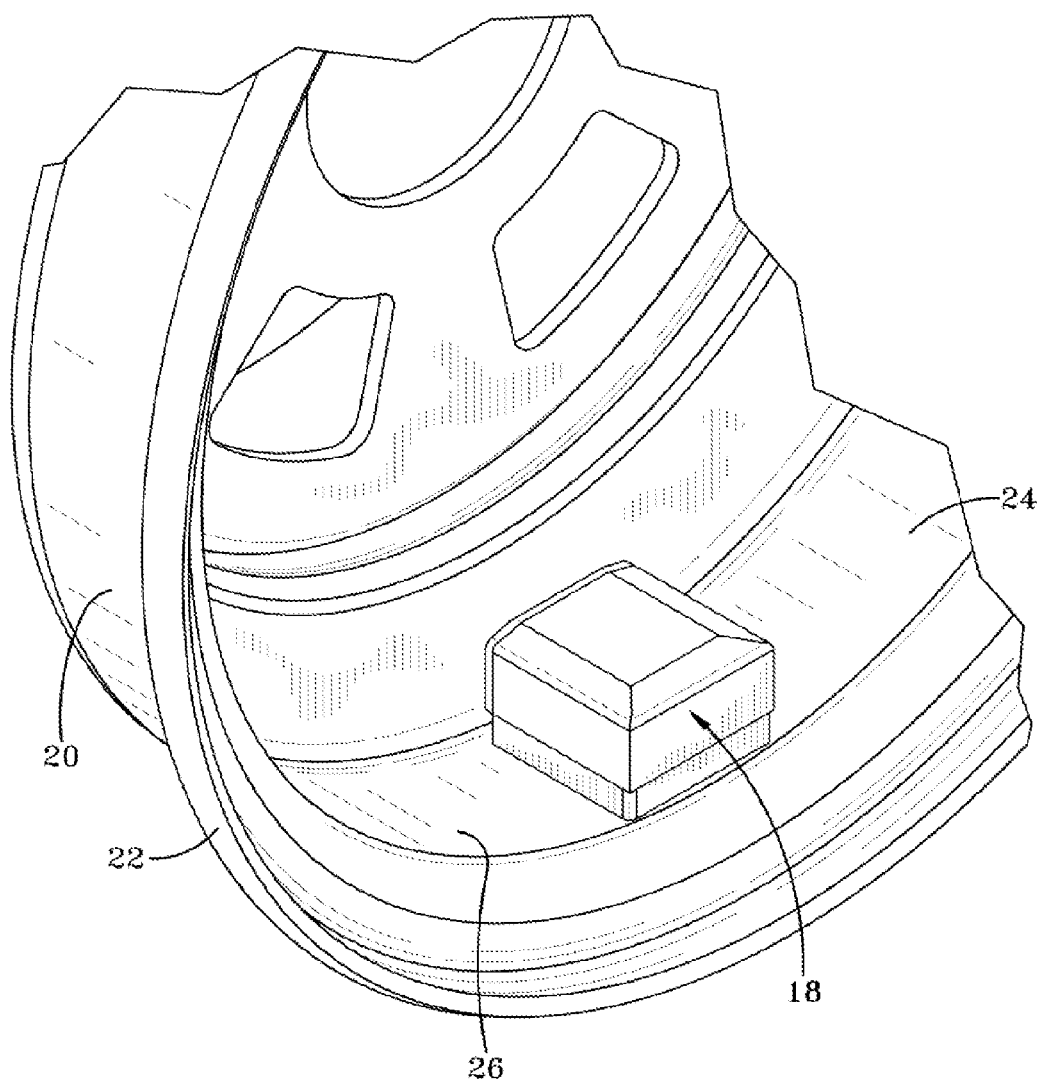
FIG. 1 is a perspective view of a tire rim portion having a tire pressure monitoring module (TPMM) mounted thereto.
Figure 2:
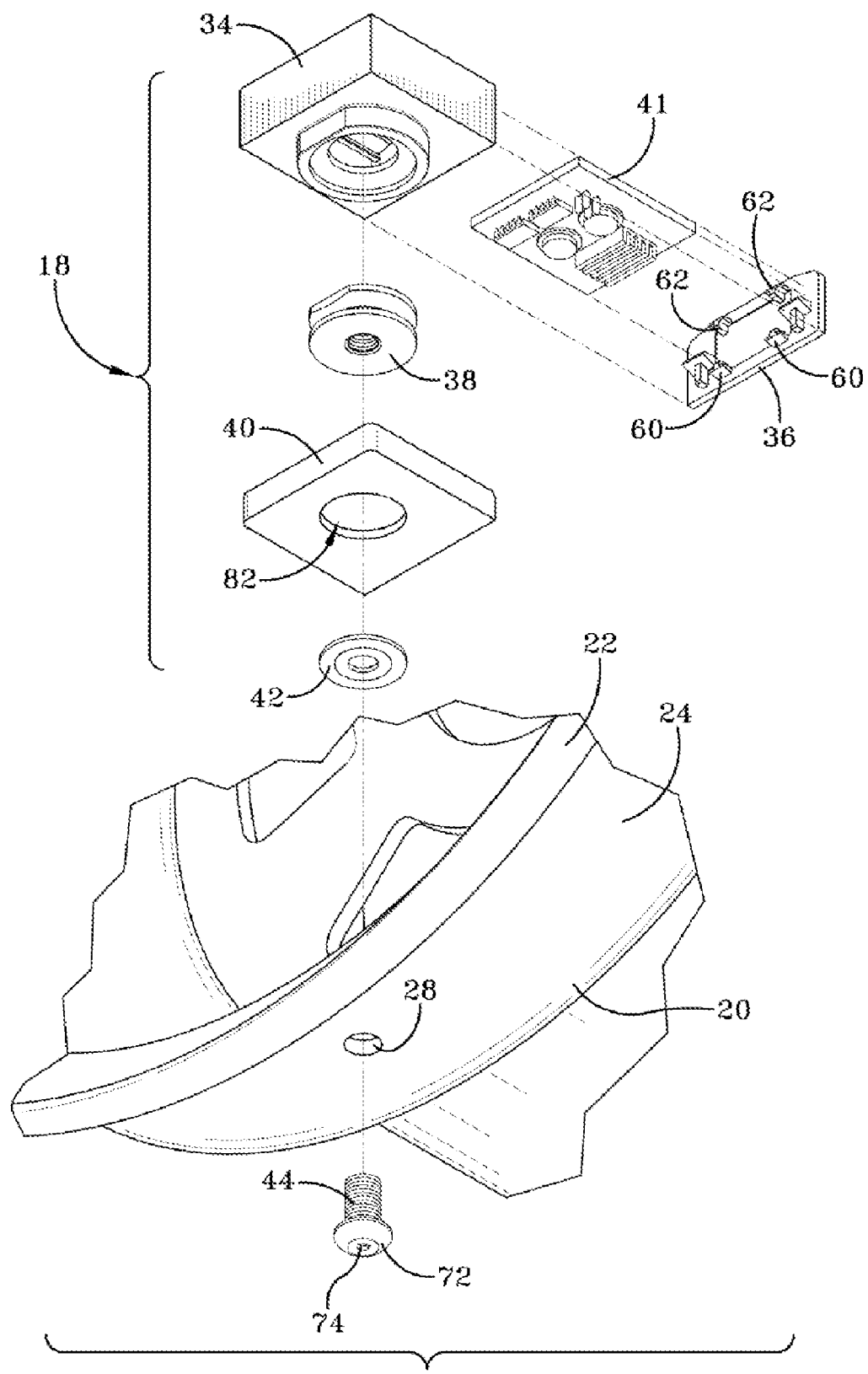
FIG. 2 is an exploded perspective view of a rim portion and tire pressure monitoring module configured pursuant to the invention.
Figure 5:
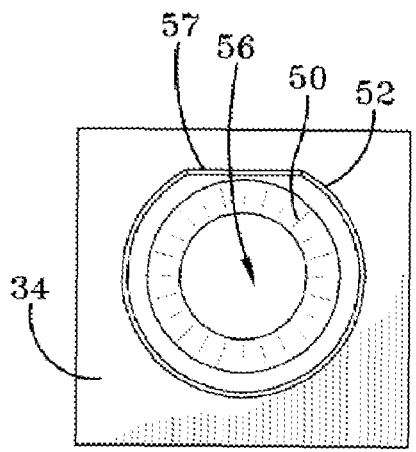
FIG. 5 is a top plan view of the TPMM housing.
Figure 4:
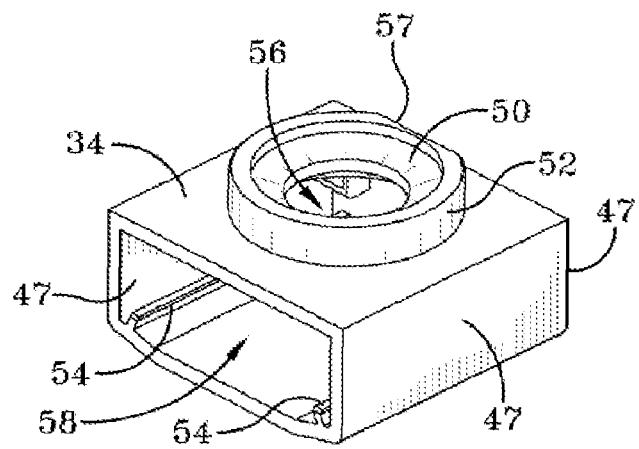
FIG. 4 is a perspective view of the TPMM housing.
Figure 6:
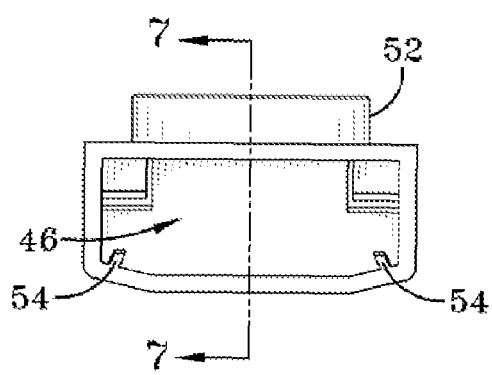
FIG. 6 is a front elevation view of the TPMM housing.
Figure 7:
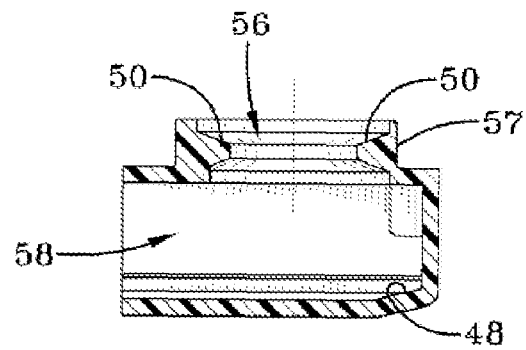
FIG. 7 is a transverse section view through the TPMM housing taken along the line 7-7 of FIG. 6.

With reference to FIGS. 1, 2, and 3, a tire, rim, and tire pressure monitoring module assembly 10 is shown. The rim 12 is of a conventional rim configuration. A two tire system, such as that used in NASCAR racing, is depicted for the purpose of illustration, it being understood that the subject rim mounted tire pressure monitoring system is capable of utilization in a single tire and rim application. A pair of spaced apart tire bodies 14, 16 of conventional tire configuration is mounted to the rim 12, the tire body 16 representing an inner tire and the tire body 14 representing an outer tire. The inner tire 16 functions to maintain stability in the event the outer tire 14 is damaged or otherwise deflates. In a two tire system such as that shown, both tires are mounted to a common rim internal surface region 20. With the beads of the tire bodies 14, 16 properly seated on surface 20, the inner tire 16 (which has higher inflation pressure than the outer tire) pushes both beads against the rim flange 22. The inner tire 16 is formed to provide molded grooves 88 to allow the inflation pressure in the cavity 30 of the outer tire 14 to reach the area adjacent to the flange between the two beads for tire pressure measurement.

As described above, the air pressure within the tire cavity 32 of the inner tire 16 is maintained higher than the pressure of the outer tire body 14. In order to achieve competitive equality between racing cars and for safety considerations, the air pressure within the tire body 14 is monitored. A tire pressure monitoring module 18 is employed for this purpose. Module 18 is mounted to an outward facing rim surface 24 adjacent a rim well wall 26. As best seen from a collective consideration of FIGS. 1, 2, and 3, the module 18 includes a casing or housing 34, an end cap 36, an annular body 38, a gasket 40, a circuit board 41, a sealing washer 42, and bolt 44.

With reference to FIGS. 4, 5, 6, and 7, the module housing 34 includes an internal pressure chamber 46 enclosed by three sidewalls 47 and end cap 36. An internal shoulder 48 is formed within the chamber 46 opposite an open side 58. A generally circular collar 52 projects from the housing 34 and an annular shoulder 50 projects into a collar passageway 56. The passageway 56 extends through the collar 52 and the annular shoulder 50 into communicating relationship with the chamber 46. A pair of circuit board supporting rail flanges 54 extends along the interior of the housing 34 as shown and a flat surface 57 is formed in a side of the collar defining bore 56. The housing 34 may be formed from any suitable material such as moldable thermoplastic or thermoset plastics material having sufficient temperature and strength characteristics for strength and dimensional stability in a tire/wheel rim environment.

As shown in FIGS. 10, 11, 12, and 13, the end cap 36 is a generally rectangular cap formed of suitable material such as the material of housing 34. The end cap is attached securely to the housing 34 by laser welding, ultrasonic welding, adhesive or other suitable means to enclose the opening 58 and includes a pair of integrally molded projecting protrusions 60 and a pair of protrusions 62. Protrusions 60, 62 locate the end cap 36 into the housing opening. The end cap 36 further has a spaced apart pair of T-shaped protrusions 64. The circuit board 41 is inserted through the opening 58 and positioned on the support rail flanges 54. The board may then be slid into the chamber 46 of housing 34 until abutment. Thereafter, the end cap 36 is securely attached by appropriate means to the housing 34 over the opening 58. Secure attachment of end cap 36 to the housing 34 creates an airtight seal between the end cap and the housing such that air within the chamber 46 cannot escape. Protrusions 64 engage the circuit board 41 within the chamber 46 to fix the board 41 in place and deter movement of the board within the housing 34.

Figure 8:
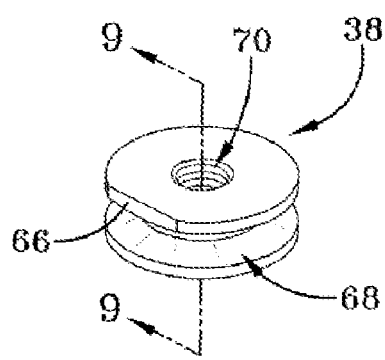
FIG. 8 is a top perspective view of the insert body.
Figure 9:
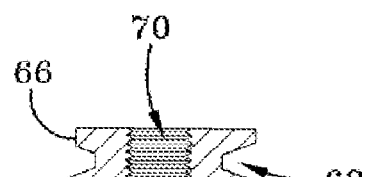
FIG. 9 is a transverse section view through the insert body taken along the line 9-9 of FIG. 8.

As will be appreciated from FIGS. 8 and 9, the annular body 38 is dimensioned and configured to seat within the housing opening 56 and includes a flat surface 66 that registers opposite the flat surface 57 of the housing collar 52. So positioned, the insert body 38 is constrained from rotating within the housing collar 52. The annular shoulder 50 of the collar 52 is positioned within an annular groove 68 in the annular body 38 and acts to locate and secure the insert body within the collar 52. The annular body 38 is formed having a threaded through bore 70. The body 38 may be formed of any suitable material having requisite strength. The annular body 38 is preferably although not necessarily formed of stainless steel having internal threads to accept the mounting bolt 44. The bolt 44 is likewise preferably formed of metal. Washer 42 is preferably formed of a composite material. The metal-to-metal contact between the annular body 38, the washer 42, the bolt 44 and the rim 12 eliminates compression stress on the plastic housing 34.

The mounting bolt 44 is externally threaded and includes a bolt head 72 and an axial through bore 74. The bolt may be approximately ¼ inches in length with a 0.080 inch diameter through bore 74. It will be appreciated that the module 18 is exposed to external contact and forces. Such forces may be sufficient to break off the module 18 from the rim surface 24, leaving the attachment bolt 44 inside the rim. The air from the tire cavity 30 in such an event would thereupon freely escape from the cavity through the bolt passageway 74 at a rapid rate. The resulting rapid loss of air pressure in the tire 14 could destabilize the car and result in a loss of control.

In order to control the tire inflation leak down rate in the event that the module detaches, leaving the bolt 44 in the rim, the bolt 44 may incorporate air flow rate regulation within the bore 74 to slow the rate of air loss from the tire 14. The air flow rate through the bore 74 may be reduced by making the diameter of the bore 74 sufficiently small so as to only allow evacuation of air therethrough at a low rate.

An alternative means for constricting air flow through the passageway 74 would be to incorporate a small orifice hypodermic needle (not shown) of a type commercially available into the bolt passageway 74 to effectively reduce the diameter of the air flow path. The needle would function to regulate air flow rate to a low level to, again, afford adequate time to warn the vehicle operator.

Another alternative means for regulating the flow of air through the passageway 74 would be to incorporate a porous insert body 73 within the passageway 74 as shown in FIG. 3. The porous insert body 73 would act as a filter and slow the flow of air through the passageway 74 to a rate low enough to provide time to warn the vehicle operator. The insert body or filter 73 may be formed of any suitable porous material that is sufficiently durable to withstand the forces encountered. For example, without limitation intended, the insert body 73 may be composed of sintered metal such as brass. Granular metal may be encapsulated within the passageway 74 of the bolt 44. Application of heat and pressure will cause the metal particles to fuse together and form a matrix construction. The metal particles will further fuse to the bolt internal sidewalls defining passageway 74, stabilizing the insert and fixing it at an intended location within passageway 74. The degree of filtering or restriction of air flow through the bolt passageway 74 may be controlled by the size, quantity, and composition of the metal particles used. Higher particle density and lower particle size will provide greater air flow restriction. Forming the filter 73 in place within passageway 74 allows for greater uniformity, convenience, and manufacturing efficiency.

In tests, a change of air pressure from 40 psi to 5 psi was made by the removal of a valve core in a standard inflation valve. The opening resulting therefrom was a bore of 0.15 inches. The opening did not have a sinter metal filter as explained herein. Air pressure loss occurred in ½ minute. Two other tests were conducted using bore sizes of 0.1 inch and 0.08 inch, both with a sinter metal filter. The pressure loss from 40 psi to 5 psi occurred in 18.5 and 35 minutes, respectively, for the 0.1 inch and 0.08 inch bore sizes with sintered metal filter.

While the embodiment of FIGS. 2 and 3 show the regulation of air flow through the passageway 74 of bolt connector 44, the invention is not intended to be so limited. Restricting the air flow rate through other orifices of the rim by the use of a sinter metal body may also be employed. For example, without an intent to limit the invention, a TPMM system may employ multiple through holes through a rim at various locations. An aperture, for example, may couple with a pipe that will communicate air pressure levels within a tire cavity a distance back to a module 18. If the pipe is damaged and breaks off the assembly during use, the same undesirable rapid leakage through the aperture connecting to an end of the pipe could occur. In order to regulate the otherwise uncontrolled and rapid flow of air through the aperture, the aperture may be sized small enough to only allow a slow leak down rate. Alternatively, the aperture may be fitted with a needle orifice to slow the rate of air flow. Still further, the aperture may be fitted with a sintered metal insert body that slows the flow of air out of the aperture. The advantage attendant a slowing of the leak down rate through the aperture would be the same as described above in reference to FIGS. 2 and 3; that is to allow sufficient time to warn an operator of the vehicle before deflation of the tire occurs.

FIGS. 14, 15, and 16 illustrate the gasket 40 in detail. The gasket 40 includes sidewalls 84 and having a wall 86. A larger dimensioned chamber 76 of circular cross-sectional configuration extends into the gasket wall 86 to an annular flange 78. A flat surface 80 defines a side of the chamber 76 within the gasket. An opening 82 of reduced diameter extends from the annular flange 78 to an opposite side of the gasket. The gasket is formed of a high temperature material such as a fluoroelastomeric material. The washer 42 may likewise be formed of a high temperature material such as a composite metal and elastomeric material.

The transponder board 41 may include temperature and pressure measuring devices common to the industry. In addition, the board 41 may include ID data storage and calibration constraints. Operation of the board 41 is to monitor and measure temperature and/or pressure within the tire 14 and communicate a signal representing measured values to an external reader (not shown). Devices suitable for use for such a purpose are common and commercially available.

The tire pressure monitoring module 18 is mounted to the rim 12 as will be apparent from FIGS. 1, 2, and 3. The circuit board 41 is sealed within the pressure chamber of the housing 34 by the end cap 36. The hole 28 is drilled through the rim surface 20 and the bolt 44 extends therethrough. The washer 42 receives the bolt shaft therethrough and abuts against surface 24 of the rim to prevent air from leaking around the bolt. The housing collar portion 52 receives the annular body 38 therein with the annular flange 50 of the housing 34 entering into the annular groove 68 of the insert body. The gasket 40 is positioned over the housing 34 and receives the collar portion 52 of the housing 34 into the gasket opening 76. The flat surface 57 of the collar 52 registers opposite the flat surface 80 of the gasket 40 to prevent relative rotation from occurring between the gasket and the housing. The washer 42 is inserted into and seats within the gasket opening 82.

The threaded shaft of bolt 44 extends through the washer 42 and the gasket 40 and threads into the insert body threaded bore 70. The tire pressure module 18 is thus firmly affixed to the rim surface 24 and against the rim surface 26. In the attached and mounted position, the bore 74 through the bolt 44 is in direct communication with the internal pressure chamber 46 of the housing 34 and the electronics on circuit board 41 for measuring temperature/pressure. The inflation pressure in the tire cavity 30 of the tire body 14 is transferred through the bore 74 of the bolt 44 to the pressure chamber in the module. The enclosed electronics within the chamber 46 sense the pressure and transmit an appropriate signal to an external reader.

As seen from FIG. 3, the subject tire pressure monitoring module 18 mounts directly to outer surface 24 of rim 12. The module is thus accessible for replacement or repair should the need arise. Moreover, the bolt head 72 is in direct contact with the tire cavity 30. The sensor module is mounted on the opposite side of the rim as the tires and does not contact either tire 14, 16. The pressure monitoring module 18 is accordingly in a non-contacting relationship with the tire(s) mounted to the rim 12. Accuracy of the module 18 in measuring air pressure within the tire(s) is accordingly not dependent on maintaining a secure mechanical coupling between the tire and the pressure sensor as is the case with state of the art systems such as valve stem mounted pressure monitoring systems. In racing applications, a plurality of grooves 88 are formed within the inner tire 16 and function to allow the air within the cavity 30 of tire 14 to have direct access to the bolt head 72.

From the foregoing, it will be readily apparent that the subject system that mounts the pressure monitoring module 18 directly to the rim 12 achieves significant advantages. Inflation pressure may be measured without touching the tire(s) and a positive indication of specific tire pressure in the outer tire may be accurately read. The data transmission protocol within each module 18 may be designed to prevent one racing team from reading another team's tire/rim/module systems. Since the valve stem of the tires is not engaged by the subject invention module 18, a mechanical pressure gauge may be used on the valve stem if desired to validate the measurement of the module 18. Such a redundancy and cross-verification can insure that a correct determination of the tire pressure is made. The module 18 mounts on an outer surface of the rim 12 and is thus protected and can survive multiple races in contrast with tire mounted devices that must endure the forces imposed on the devices by the tire. The module 18 may be incorporated as a standard component of a tire/wheel assembly and the operation of the module may be verified before the tire/wheel assembly is released from production. The electronics within the module 18 may further work with or without electro-magnetic transmission shields. While only one sensor module 18 is shown attached to the rim, multiple modules 18 may be deployed if desired, monitoring the same or differing cavities within the tire components.

Additionally, the system incorporates means 44, 73, 74 for controllably regulating (reducing) the flow of air through the passageway 74 should the module 18 become damaged or detach from the rim 12 during use. The housing 34 of the tire pressure monitoring module assembly 18 includes an internal pressure chamber 46; electronics 41 including a pressure sensing device within the housing pressure chamber 46; an elongate connecting member 44 extending through the housing and the rim mounting surface, the passageway 74 extending axially through the connecting member 44 in communication with the internal tire cavity 30 and the housing pressure chamber 46.

Obstruction of air flow through the passageway through the rim 12 may be by controlling the diameter of the passageway 74 or incorporating a hypodermic needle orifice (not shown), or by incorporating a porous insert body 73 into the passageway. The insert body 73 may be composed of sintered metal and may be fused in place to the internal sidewalls of the bolt defining passageway 74. The matrix construction of the sintered metal insert or filter 73 acts to slow down the flow of air through the passageway 74. Enough time is thereby available to provide the operator of the vehicle with a warning. The rate of air flow through the filter 73 may be varied by design by varying the mass of the sinter metal material composing the filter 73 or by using materials that form filters of varying particle spacing within the filter. A tighter spacing of particles forming the filter 73 would serve to slow the flow of air therethrough and a wider spacing of particles would allow a higher flow rate. Similarly, the size of the filter 73 within the passageway will affect the flow rate; a wider filter slowing the flow of air to delay the leak down versus a narrower filter geometry. Thus, by designing the filter 73 and passageway size, a controlled leak down may be incorporated. The time interval between a reduction of air pressure from 40 psi to 5 psi may thereby be designed into the tire and wheel rim assembly. The time interval may be so designed so as to correspond to an adequate warning time to the user of the tire and wheel assembly.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire and wheel rim assembly comprising:
   a tire supporting rim having an inward facing tire mounting surface;
   at least one tire body mounted to the rim positioning an internal tire cavity over the tire mounting surface;
   a rim passageway extending through the rim for communicating air pressure within the tire cavity to a monitoring device secured to an outward side of the rim opposite the tire cavity;
   the rim passageway having internal air flow regulating means for operatively controlling the air flow rate through the rim passageway from within the rim passageway to a controlled non-zero leak-down rate.

2. A tire and wheel rim assembly according to claim 1, wherein further comprising:
   the monitoring device comprising at least one tire pressure monitoring module assembly mounted to the outward side of the rim and comprising: a housing having an internal pressure chamber; a pressure sensing device within the housing pressure chamber; an elongate connecting member extending through the housing and the rim passageway and operatively connecting the module assembly to the rim, the connecting member having an axial passageway extending axially through the connecting member in communication with the internal tire cavity and the housing pressure chamber.

3. An assembly according to claim 2, wherein the connecting member is a bolt extending through the rim and the axial passageway extending through the bolt.

4. An assembly according to claim 3, wherein the air flow regulating means comprises the axial passageway of the connecting member operatively sized to a controlled reduced diameter.

5. An assembly according to claim 3, wherein the air flow regulating means comprises a porous insert body within the axial passageway of the connecting member.

6. An assembly according to claim 5, wherein the porous insert body is at least partially composed of sinter metal.

7. An assembly according to claim 5, wherein the porous insert body is at least partially fused to internal bolt sidewalls defining the axial passageway.

8. An assembly according to claim 1, wherein the air flow regulating means comprises a connecting member extending through the rim passageway, the connecting member having an axial passageway diameter sized to operatively delay leak down between an upper tire inflation pressure and a lower non-zero tire inflation pressure for a targeted time interval.

9. An assembly according to claim 1, wherein the air flow regulating means comprises a porous insert body within an axial passageway of a connecting bolt extending through the rim passageway.

10. An assembly according to claim 9, wherein the porous insert body is at least partially composed of sintered metal.

11. An assembly according to claim 9, wherein the porous insert body is at least partially fused to internal bolt sidewalls defining the axial passageway.

12. An assembly according to claim 11, wherein the porous insert body operatively regulates an air flow through the bolt axial passageway to control leak down from the tire between an upper pressure and a lower non-zero air pressure for a targeted time interval.

13. An assembly according to claim 12, wherein the air flow through the porous insert body is regulated by the mass of porous metal comprising the insert body.

14. An assembly according to claim 13, wherein targeted time interval comprises a leak down time interval within which to operatively provide a warning to a user of the tire and wheel rim assembly.

15. An assembly according to claim 1, wherein the air flow through the rim passageway is regulated within the passageway to control a rate of leak down from the tire through the rim passageway between an upper tire air pressure and a lower non-zero pressure for a targeted time interval.

16. An assembly according to claim 15, wherein the targeted time interval comprises a leak down time interval within which to provide a warning to a user of the tire and wheel rim assembly.

17. A tire and wheel rim assembly comprising:
   a tire supporting rim having an inward facing tire mounting surface;
   at least one tire body mounted to the rim positioning an internal tire cavity over the tire mounting surface;
   an air pressure measuring device secured to an outward side of the rim opposite the tire cavity;
   an air flow rate regulating passageway extending through the rim for substantially continuously communicating air pressure between the tire cavity and an internal chamber of the air pressure measuring device; and
   the regulating passageway operatively controls from within the passageway a leak down rate of air flow through the passageway between the tire cavity and the outward side of the rim between an upper tire air pressure and a lower non-zero tire air pressure for a targeted time interval.

18. The tire and wheel rim assembly of claim 17, wherein the targeted time interval comprises a leak down time interval sufficient to provide a warning to a user of the tire and wheel rim assembly.

19. The tire and wheel assembly of claim 18, wherein the air flow rate regulating passageway comprises an axial bore extending through an elongate connecting member, the connecting member operatively attaching the air pressure measuring device to the outward side of the rim.

20. The tire and wheel assembly of claim 19, wherein the air flow rate regulating passageway further comprises a porous insert body situated within the axial bore of the connecting member.

\* \* \* \* \*